US011271499B2

(12) United States Patent
Xia et al.

(10) Patent No.: US 11,271,499 B2
(45) Date of Patent: Mar. 8, 2022

(54) DC BUS DISCHARGE CONTROL METHOD, APPARATUS AND DEVICE, AND STORAGE MEDIUM

(71) Applicant: GAC AION NEW ENERGY AUTOMOBILE CO. LTD, Guangdong (CN)

(72) Inventors: Zhuliang Xia, Guangdong (CN); Lingwei Liang, Guangdong (CN); Shu Cheng, Guangdong (CN); Xiaokun Zhao, Guangdong (CN); Xiutian Liu, Guangdong (CN); Xiang Han, Guangdong (CN)

(73) Assignee: GAC AION NEW ENERGY AUTOMOBILE CO. LTD, Guangzhou (CN)

( * ) Notice: Subject to any disclaimer, the term of this patent is extended or adjusted under 35 U.S.C. 154(b) by 0 days.

(21) Appl. No.: 16/331,980

(22) PCT Filed: Aug. 31, 2018

(86) PCT No.: PCT/CN2018/103622
§ 371 (c)(1),
(2) Date: Mar. 10, 2019

(87) PCT Pub. No.: WO2019/119871
PCT Pub. Date: Jun. 27, 2019

(65) Prior Publication Data
US 2021/0336569 A1 Oct. 28, 2021

(30) Foreign Application Priority Data
Dec. 20, 2017 (CN) .......................... 201711385477.6

(51) Int. Cl.
*H02P 21/22* (2016.01)
*H02P 6/28* (2016.01)
(Continued)

(52) U.S. Cl.
CPC ............... *H02P 6/28* (2016.02); *H02P 21/22* (2016.02); *H02P 27/08* (2013.01)

(58) Field of Classification Search
CPC .. H02P 21/22; H02P 27/06; H02P 6/28; H02P 27/08
See application file for complete search history.

(56) References Cited

U.S. PATENT DOCUMENTS

| 7,482,777 B2 * | 1/2009 | Tomigashi | H02P 6/18 |
| | | | 318/400.02 |
| 9,692,339 B2 * | 6/2017 | Rogg | H02P 21/22 |

(Continued)

FOREIGN PATENT DOCUMENTS

| CN | 102223100 A | * | 10/2011 |
| CN | 102223100 A | | 10/2011 |

(Continued)

OTHER PUBLICATIONS

Feng, Yi et al. "Wind power grid-connected inverter control method based on proportional complex integral regulator". Transactions of the Chinese Society of Agricultural Engineering. Jul. 31, 2016 (Jul. 31, 2016). vol. 32 No. 13. pp. 177-179.

*Primary Examiner* — Thai T Dinh
(74) *Attorney, Agent, or Firm* — ScienBiziP, P.C.

(57) ABSTRACT

Provided is a Direct Circuit (DC) bus discharge control method, including that: an active discharge instruction is received; a motor current signal is acquired according to the active discharge instruction; the motor current signal is converted into a current signal in a stator coordinate system; a voltage control signal in the stator coordinate system is output based on the current signal in the stator coordinate system and a current reference instruction of a preset stator coordinate system, the current reference instruction of the preset stator coordinate system being a high-frequency alternating current; and the voltage control signal in the stator (Continued)

coordinate system is converted into a three-phase voltage control signal, and a working state of a switching device is controlled according to the three-phase voltage control signal.

17 Claims, 6 Drawing Sheets

(51) Int. Cl.
*H02P 27/08* (2006.01)
*H02P 27/06* (2006.01)

(56) References Cited

U.S. PATENT DOCUMENTS

| | | | |
|---|---|---|---|
| 9,812,998 B2* | 11/2017 | Lim | F16P 3/00 |
| 10,075,107 B2* | 9/2018 | Lepka | H02P 29/0241 |
| 2006/0193090 A1* | 8/2006 | Ho | H02P 21/141 |
| | | | 361/23 |
| 2009/0056385 A1* | 3/2009 | Maekawa | D06F 34/10 |
| | | | 68/12.16 |
| 2013/0043816 A1* | 2/2013 | Welchko | H02M 1/32 |
| | | | 318/400.21 |
| 2015/0311847 A1* | 10/2015 | Kim | H02P 6/18 |
| | | | 318/400.02 |
| 2015/0372629 A1* | 12/2015 | Huang | H02P 21/13 |
| | | | 318/400.02 |
| 2016/0233807 A1* | 8/2016 | Rogg | H02P 21/14 |

FOREIGN PATENT DOCUMENTS

| | | |
|---|---|---|
| CN | 105270182 A | 1/2016 |
| CN | 106230243 A | 12/2016 |
| JP | 2012016234 A | 1/2012 |

* cited by examiner

DC BUS DISCHARGE CONTROL METHOD, APPARATUS AND DEVICE, AND STORAGE MEDIUM

TECHNICAL FIELD

The present disclosure relates to the field of automobiles, and more particularly to a Direct Circuit (DC) bus discharge control method, apparatus and device, and a storage medium.

BACKGROUND

A high-voltage system of an electric vehicle using a permanent magnet synchronous motor as a driving motor is composed of a power battery pack, a driving motor inverter, a permanent magnet synchronous motor and other high-voltage electric appliances. In the case of a serious fault, an internal relay of the power battery pack is turned off to stop supplying power to a high-voltage loop, but it would cause a high voltage on capacitor on a DC bus due to the residual power. The high voltage would give potential safety risks to passengers and maintenance personnel. Therefore, to comply the vehicle safety specification, after the internal relay of the battery pack is turned off, the residual power of the high-voltage DC bus needs to be discharged quickly by a certain method. This discharge process is called active discharge of the high-voltage system.

In the discharge method for controlling a DC bus in related technologies, a rotor rotation angle of the permanent magnet synchronous motor is acquired by a rotor position sensor, and a stator current is controlled according to the rotor rotation angle to control the discharge of the DC bus. However, in this method, once the rotor position sensor fails, the rapid discharge of the DC bus cannot be achieved.

SUMMARY

In view of the problem, a DC bus discharge control method, a DC bus discharge control apparatus, a computer device and a computer storage medium are provided to solve the problem that a DC bus cannot be rapidly discharged once a rotor position sensor fails.

A DC bus discharge control method may include the operations as follows.

An active discharge instruction is received.

A motor current signal is acquired according to the active discharge instruction.

The motor current signal is converted into a current signal in a stator coordinate system.

A voltage control signal in the stator coordinate system is output based on the current signal in the stator coordinate system and a current reference instruction of a preset stator coordinate system, the current reference instruction of the preset stator coordinate system being a high-frequency alternating current.

The voltage control signal in the stator coordinate system is converted into a three-phase voltage control signal, and a working state of a switching device is controlled according to the three-phase voltage control signal.

In one of the embodiments, the method may further include that: the switching device is controlled to be turned off when it is detected that voltage on a DC bus reaches a preset safe voltage.

In one of the embodiments, the operation that the voltage control signal in the stator coordinate system is output based on the current signal in the stator coordinate system and the current reference instruction of the preset stator coordinate system may include the operation as follows.

The voltage control signal in the stator coordinate system is output by performing a feedback control computation on the current signal in the stator coordinate system and the current reference instruction of the preset stator coordinate system.

In one of the embodiments, the operation that the working state of the switching device is controlled according to the three-phase voltage control signal may include the operation as follows.

A control signal for controlling the switching device is generated by performing Pulse Width Modulation (PWM) on the three-phase voltage control signal.

In one of the embodiments, the operation that the motor current signal is converted into the current signal in the stator coordinate system may include that: the motor current signal is converted into the current signal in the stator coordinate system by Clarke transformation.

The operation that the voltage control signal in the stator coordinate system is converted into the three-phase voltage control signal may include that: the voltage control signal in the stator coordinate system is converted into the three-phase voltage control signal by Clarke transformation.

In one of the embodiments, a current reference signal of the current reference instruction of the stator coordinate system may include an α-axis component current and a β-axis component current, in any one period T, a definite integral result of the α-axis component current is 0, a definite integral result of the β-axis component current is 0, a definite integral result of the difference between the square of the α-axis component current and the square of the β-axis component current is 0, and a definite integral result of a product of the α-axis component current and the β-axis component current is 0.

A DC bus discharge control apparatus may include:

an active discharge instruction receiving module, configured to receive an active discharge instruction;

a motor current signal acquisition module, configured to acquire a motor current signal according to the active discharge instruction;

a current signal conversion module, configured to convert the motor current signal into a current signal in a stator coordinate system;

a voltage control signal output module, configured to output a voltage control signal in the stator coordinate system based on the current signal in the stator coordinate system and a current reference instruction of a preset stator coordinate system, the current reference instruction of the preset stator coordinate system being a high-frequency alternating current; and a voltage control signal conversion module, configured to convert the voltage control signal in the stator coordinate system into a three-phase voltage control signal, and control a working state of a switching device according to the three-phase voltage control signal.

In one of the embodiments, the apparatus may further include a voltage detection module, configured to control, when voltage on a DC bus is detected to reach a preset safe voltage, the switching device to be turned off.

A storage medium may have a computer program stored thereon, wherein the computer program is executed by a processor to implement the DC bus discharge control method as described in any one of the above.

A computer device may include a processor, a memory and a computer program that is stored on the memory and is able to be executed by the processor. The computer program may be executed by the processor to implement the DC bus discharge control method as described in any one of the above.

According to the DC bus discharge control method and apparatus, the storage medium and the computer device, when an active discharge instruction is received, a motor current signal is acquired, the motor current signal is converted into a current signal in a stator coordinate system, a voltage control instruction in the stator coordinate system is output based on the current signal in the stator coordinate system and a preset high-frequency alternating current reference instruction of a preset stator coordinate system, a voltage control signal in the stator coordinate system is converted into a three-phase control signal, and a working state of a switching device is controlled according to the three-phase voltage control signal. Since a motor current is converted and controlled in the stator coordinate system, rotor rotation angle information is not required, so that the normal discharge operation of the DC bus can be ensured when a motor rotor position sensor fails.

DETAILED DESCRIPTION OF THE EMBODIMENTS

The embodiments of the present disclosure are specifically described below in conjunction with the accompanying drawings.

Figure 1:
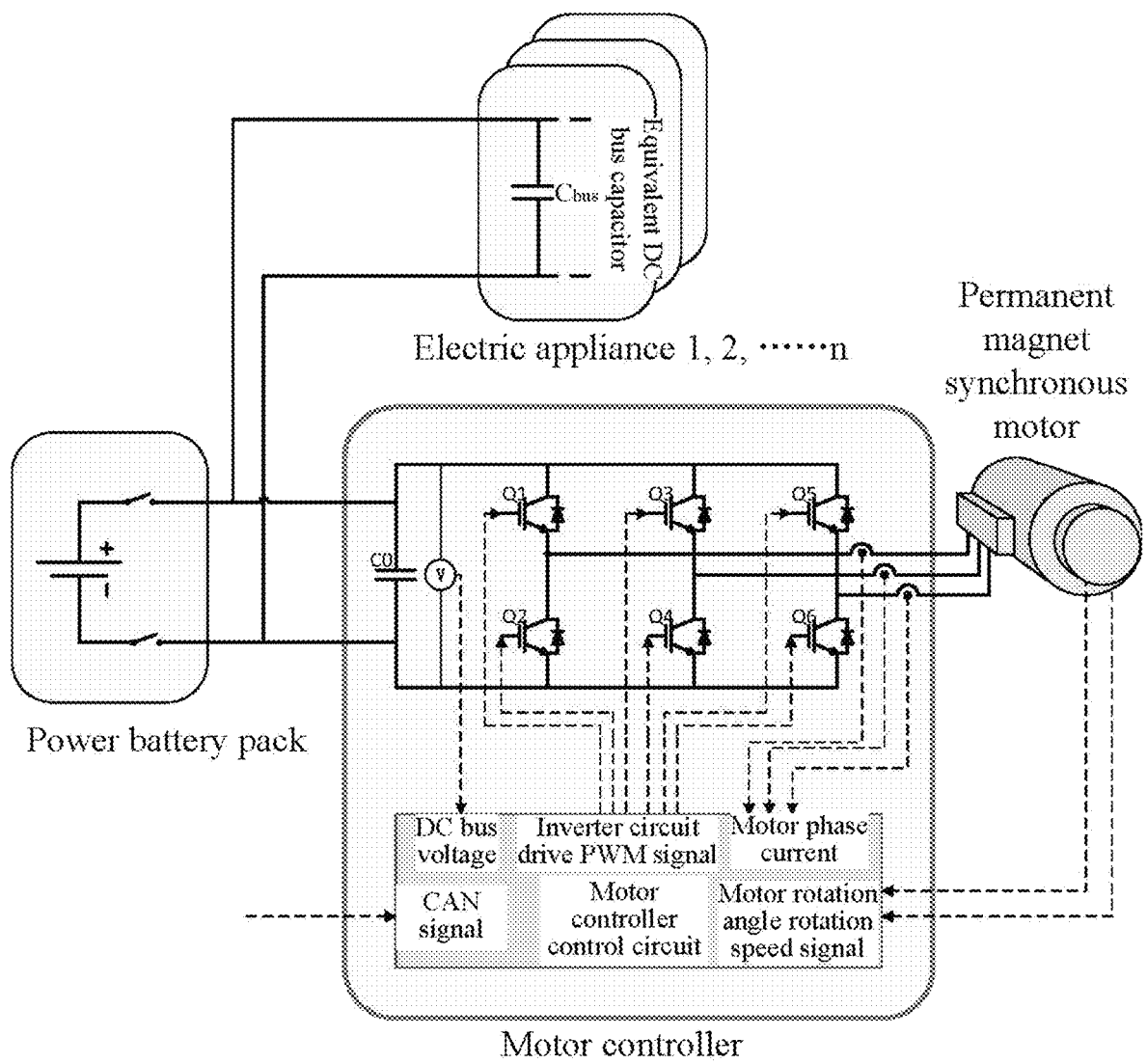
FIG. 1 is a schematic diagram of a high-voltage system of an electric vehicle and a motor controller according to an embodiment of the present disclosure.

FIG. 1 illustrates a schematic diagram of a high-voltage system of an electric vehicle and a motor controller according to an embodiment. The system uses a permanent magnet synchronous motor as a driving motor, and is composed of a power battery pack (high-voltage battery pack), a driving motor inverter (motor controller), a permanent magnet synchronous motor and other high-voltage electric appliances. Each electric appliance has an energy storage capacitor on a high-voltage DC input side, such as capacitors $C_{bus}$ and C0 in FIG. 1. In the case of a serious fault, an internal relay of the power battery pack is turned off to stop supplying power to a high-voltage loop, but a capacitor on a high-voltage DC bus has high voltage due to residual power. The high voltage poses potential safety risks for passengers and maintenance personnel. Therefore, the vehicle safety specification requires that after the internal relay of the battery pack is turned off, the residual power of the high-voltage DC bus is quickly discharged by a certain method. This discharge process is called active discharge of the high-voltage system.

Figure 2:
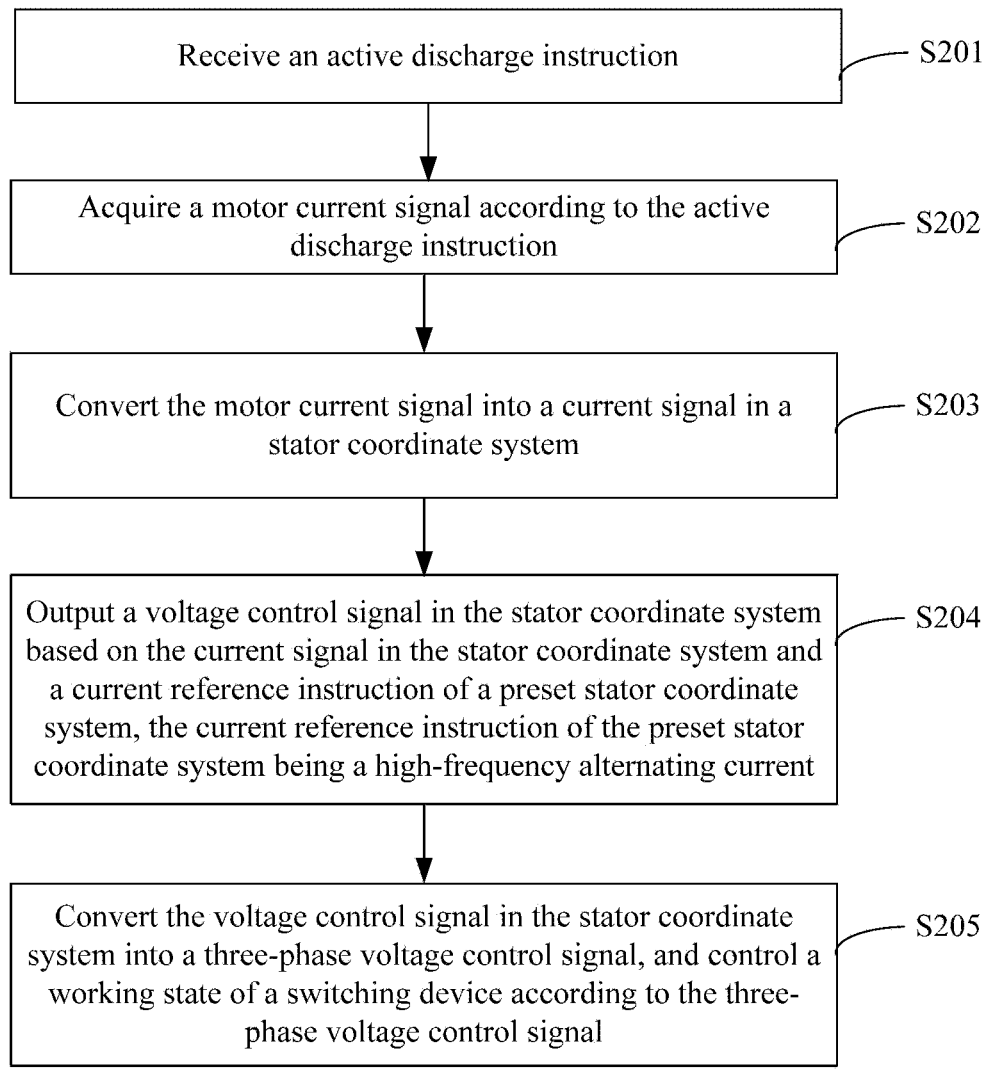
FIG. 2 is a flowchart of a DC bus discharge control method according to an embodiment of the present disclosure.

FIG. 2 shows a flowchart of a DC bus discharge control method according to an embodiment of the present disclosure. The method in the present embodiment includes operation S201 to operation S205.

At operation S201, an active discharge instruction is received.

In an embodiment, the active discharge instruction is issued by a Vehicle Control Unit (VCU). In the case of a vehicle failure and power-off of a high-voltage system of the vehicle, the VCU will issue an active discharge instruction.

At operation S202, a motor current signal is acquired according to the active discharge instruction.

In an embodiment, after receiving an active discharge instruction, a motor controller acquires a motor current signal according to the active discharge instruction, wherein the motor current signal may be a current value of the current motor. In an embodiment, a motor current signal may be acquired by a current sensor (detection apparatus, which can detect information of a measured current and can convert the detected information into an electrical signal or other information outputs in a required form meeting a certain standard requirement according to a certain rule, so as to meet information transmission, processing, storage, display, recording and control requirements).

At operation S203, the motor current signal is converted into a current signal in a stator coordinate system.

An ordinary three-phase motor does not have a neutral line, the sum of three-phase currents flowing into the motor is surely zero, that is, $I_a+I_b+I_c=0$, there is a constraint between the A-phase current $I_a$, the B-phase current $I_b$ and the C-phase current $I_c$, and the actual degree of freedom is 2. When controlling the current, three current signals are to be formed into two current signals that are orthogonal to each other.

Current coordinates $(I_\alpha, I_\beta)$ in the stator coordinate system directly correspond to three-phase currents $(I_a, I_b, I_c)$ of the motor one by one. A conversion relationship between $(I_\alpha, I_\beta)$ and $(I_a, I_b, I_c)$ is a constant matrix, and matrix coefficients do not include a rotor rotation angle θ.

In an exemplary embodiment, the motor current signal acquired by the motor controller after receiving the active discharge instruction is a three-phase current signal, and a current signal in a two-dimensional stator coordinate system is obtained by converting the acquired motor current signal based on the stator coordinate system, so as to facilitate the control operation of the motor current.

In an embodiment, the motor controller converts the motor current signal into a current signal in a stator coordinate system by Clarke transformation. Since the motor current is subjected to Clarke transformation in the stator coordinate system, rotor rotation angle information is not required, i.e., in the case of failure of a rotor position sensor, the DC bus discharge control method in the exemplary embodiment of the present disclosure can also control the rapid discharge of the DC bus, and solve the problem that the residual energy on the DC bus has safety hazards for passengers and maintenance personnel.

At operation S204, a voltage control signal in the stator coordinate system is output based on the current signal in the stator coordinate system and a current reference instruction of a preset stator coordinate system, the current reference instruction of the preset stator coordinate system being a high-frequency alternating current.

In an embodiment, the motor controller outputs the voltage control signal in the stator coordinate system after performing a feedback control computation on the current signal in the stator coordinate system and the current reference instruction of the preset stator coordinate system.

In the exemplary embodiment, the current signal in the stator coordinate system and the current reference instruction of the preset stator coordinate system are sent to a feedback control unit, and the feedback control unit performs feedback control computation on the two current signals and outputs the voltage control signal in the stator coordinate system.

In an embodiment, the current reference value of the preset stator coordinate system is a current reference value set in advance for controlling the DC bus discharge, and may be internally generated. Under the action of the feedback control unit, the motor current will change with the current reference value in the preset stator coordinate system, thereby achieving the effect of controlling the DC bus discharge.

In an embodiment, a current reference signal of the current reference instruction of the stator coordinate system includes an α-axis component current $I_\alpha^*$ and a β-axis component current $I_\beta^*$. In any one period T, a definite integral result of the α-axis component current $I_\alpha^*$ is 0, a definite integral result of the β-axis component current $I_\beta^*$ is 0, a definite integral result of the difference between the squares of α-axis component current $I_\alpha^*$ and the squares of β-axis component current $I_\beta^*$ is 0, and a definite integral result of a product of the α-axis component current $I_\alpha^*$ and the β-axis component current $I_\beta^*$ is 0. That is, the following conditions are satisfied:

$$\begin{cases} \int_{t_0}^{t_0+T} I_\alpha^*(t)dt = 0 \\ \int_{t_0}^{t_0+T} I_\beta^*(t)dt = 0 \\ \int_{t_0}^{t_0+T} [I_\alpha^*(t)^2 - I_\beta^*(t)^2]dt = 0 \\ \int_{t_0}^{t_0+T} I_\alpha^*(t)I_\beta^*(t)dt = 0 \end{cases} \quad (1)$$

where $t_0$ represents any random moment in the process of controlling the DC bus discharge, and T represents the period of the current reference instructions $I_\alpha^*$ and $I_\beta^*$ waveform of the stator coordinate system. In an embodiment, with a smaller period T, a higher current frequency can be obtained, thereby increasing the winding resistance through a skin effect, increasing the resistance loss, and accelerating the discharge speed.

In an embodiment, the current reference instruction in the stator coordinate system satisfies the following condition, which is a circle in the stator coordinate system:

$$\begin{cases} I_\alpha^* = I_{ref}\sin(2\pi ft) \\ I_\beta^* = I_{ref}\cos(2\pi ft) \end{cases} \quad (2)$$

where $I_{ref}$ is an amplitude of the current reference instruction in the stator coordinate system, and f is a frequency. $I_{ref}$ may be selected specifically according to the motor and discharge requirements, and adjusted based on experiments. For ordinary vehicle driving motors, a rate current of 20% may be selected. A larger f can increase the discharge speed. In an embodiment, the feedback control unit has a control frequency of 10 kHz, and f is 1 kHz.

In another embodiment, the current reference instruction in the stator coordinate system may also be other periodic alternating current signals.

In the present embodiment, the current reference instruction is a high-frequency alternating current, so that the skin effect generated by the high-frequency alternating current can be utilized to increase the resistance loss and accelerate the residual power discharge speed. Due to the high-frequency alternating current, the generated torque is a high-frequency alternating torque, and the impulse (torque time integral) of the torque in one current period T is zero. Because a motor and a vehicle transmission system are mechanical structures, they give little response to a high-frequency torque and therefore will hardly affect the operation of electric vehicles.

Assuming that an angle between a forward direction of a rotor coordinate D axis and a forward direction of a stator coordinate α axis is θ, the relationship between a torque $T_e$ and $I_\alpha$, $I_\beta$ is:

$$T=3/2(I_\beta \cos(\theta)-I_\alpha \sin(\theta))[\psi_m+(L_d-L_q)(I_\alpha \cos(\theta)+I_\beta \sin(\theta))] \quad (3)$$

Equation (3) and equation (1) are comprehensively analyzed to obtain:

$$\int_{t_0}^{t_0+T} T_e dt = 0 \quad (4).$$

That is, the sum of the torque in each cycle is zero, and the actual motor torque is expressed as the balanced torque of a high-frequency pulsation. Because the motor and the vehicle transmission system are mechanical structures, they give little response to the high-frequency torque. Therefore, as long as the frequency of the current signal is high, such high frequency pulsation hardly affects the rotation of the motor.

At operation S205, the voltage control signal in the stator coordinate system is converted into a three-phase voltage control signal, and a working state of a switching device is controlled according to the three-phase voltage control signal.

In an embodiment, the motor controller converts the voltage control signal in the stator coordinate system into the three-phase voltage control signal by Clarke transformation. Since the voltage control signal output by the motor controller after performing a feedback control computation on the current signal in the stator coordinate system and the current reference instruction of the preset stator coordinate system is a two-dimensional voltage coordinate in the stator coordinate system, the voltage control signal needs to be converted into a three-phase voltage signal. Therefore, the voltage control signal is converted into a three-phase voltage signal by Clarke transformation to control the working state of the switching device.

In the exemplary embodiment, the operation that the working state of the switching device is controlled according to the three-phase voltage control signal includes that: the switching device is controlled to be turned on or turned off.

In an embodiment, the operation that the working state of the switching device is controlled according to the three-phase voltage control signal may include that: a control signal for controlling the switching device is generated by performing PWM on the three-phase voltage control signal. The switching device here may be switching devices Q1, Q2, Q3, Q4, Q5 and Q6 shown in FIG. 1.

In the exemplary embodiment, the three-phase voltage control signal is used to guide the generation of a PWM waveform, and the PWM waveform controls the switches Q1, Q2, ..., Q6 to be turned on or off, thereby generating a voltage on a high-voltage line of the motor, so that an actual voltage consistent with the three-phase voltage control signal in size is generated on a three-phase line of the motor, thereby dissipating energy on the DC bus and achieving the effect of controlling the DC bus discharge.

In an embodiment, the PVVM may be 7-operation SVPWM, 5-operation SVPWM, or Sinusoidal PWM (SPWM).

In an exemplary embodiment, the three-phase voltage control signal may be modulated by the 5-operation SVPWM, so that more current ripple can be generated, which is more advantageous for a motor stator winding to consume power on the DC bus.

According to the DC bus discharge control method, when an active discharge instruction is received, a motor current signal is acquired, the motor current signal is converted into a current signal in a stator coordinate system, a voltage control instruction in the stator coordinate system is output based on the current signal in the stator coordinate system and a preset high-frequency alternating current reference instruction of a preset stator coordinate system, a voltage control signal in the stator coordinate system is converted into a three-phase control signal, and a working state of a switching device is controlled according to the three-phase voltage control signal. Since a motor current is converted in the stator coordinate system, rotor rotation angle information is not required, so that the normal active discharge operation of the DC bus can be ensured when a motor rotor position sensor fails.

Figure 3:
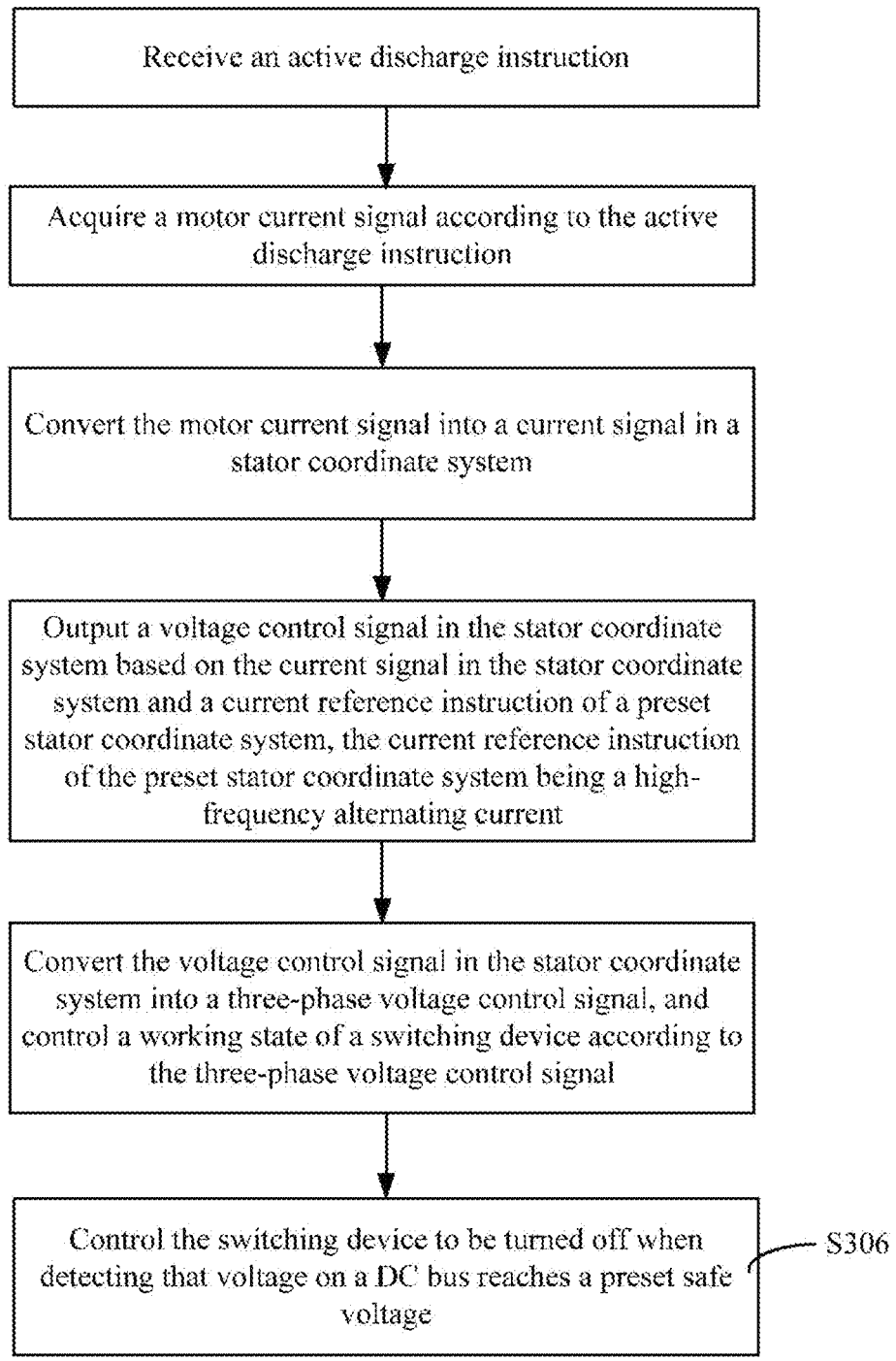
FIG. 3 is a flowchart of a DC bus discharge control method according to another embodiment of the present disclosure.

As shown in FIG. 3, based on the method of the embodiment as shown in FIG. 2, the method may further include the operation as follows.

At operation S306, the switching device is controlled to be turned off when detecting that voltage on a DC bus reaches a preset safe voltage.

The preset safe voltage may be a preset threshold voltage value indicating that the voltage on the DC bus is in a safe state. When the voltage on the DC bus is lower than the preset safe voltage to ensure that the residual energy no longer poses a safety threat to a person, the switching device can be controlled to be powered off and the active discharge can be stopped.

Figure 6:
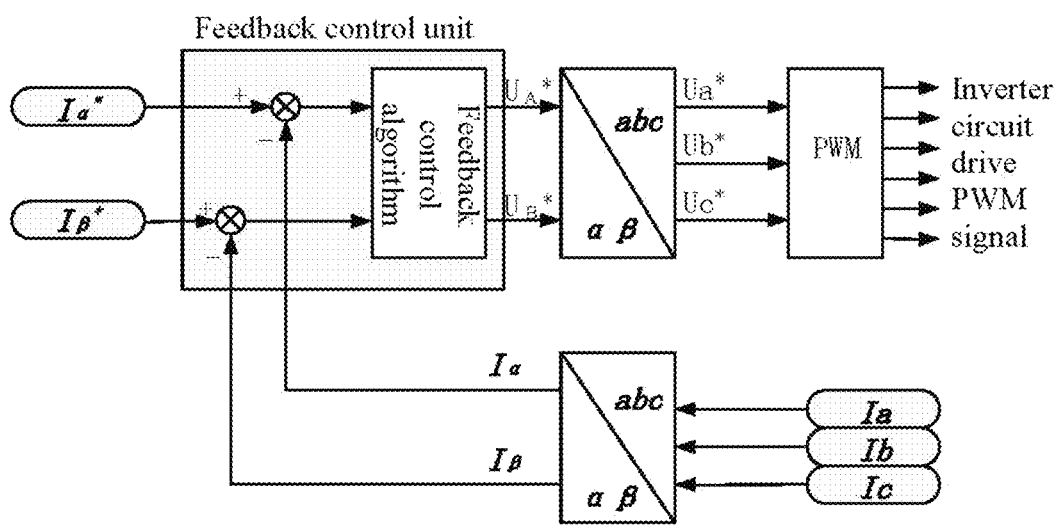
FIG. 6 is a schematic process diagram of a DC bus discharge control method according to an embodiment of the present disclosure.
Figure 7:
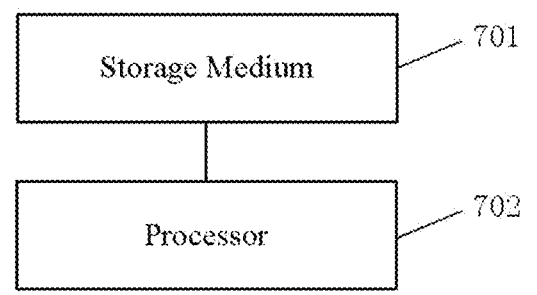
FIG. 7 is a schematic structure diagram of a storage medium and a processor according to an embodiment of the present disclosure.
Figure 8:
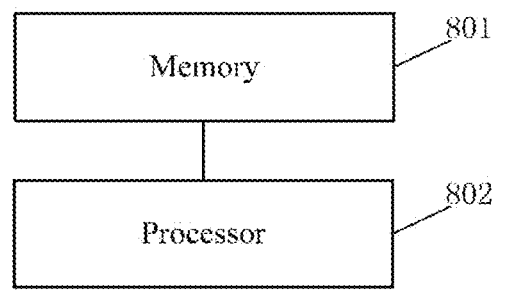
FIG. 8 is a schematic structure diagram of a computer device according to an embodiment of the present disclosure.

In an embodiment, as shown in FIG. 6, the motor controller receives an active discharge instruction from the VCU, acquires present current signals $I_a$, $I_b$, and $I_c$ of the motor, and converts the acquired present current signals of the motor into current signals $I_\alpha$ and $I_\beta$ in the stator coordinate system by Clarke transformation to facilitate the control operation of the current signals. $I_\alpha$ and $I_\beta$ and current reference instructions $I_\alpha^*$ and $I_\beta^*$ of the preset stator coordinate system are sent to a feedback control unit, feedback control computation is performed, and then voltage control signals $U_A^*$ and $U_B^*$ in the stator coordinate system are output. The voltage control signals $U_A^*$ and $U_B^*$ in the stator coordinate system are converted into three-phase voltage control signals $U_a^*$, $U_b^*$ and $U_c^*$ by inverse Clarke transformation, and PWM output control is performed on $U_a^*$, $U_b^*$ and $U_c^*$ to control PWM signals of the switching device to control the turn-on or turn-off of the switching device, so that the stator winding of the motor generates a voltage that varies with the current reference value in the stator coordinate system, thereby dissipating the residual power from the DC bus, and achieving the effect of controlling the active discharge of the DC bus.

Figure 4:
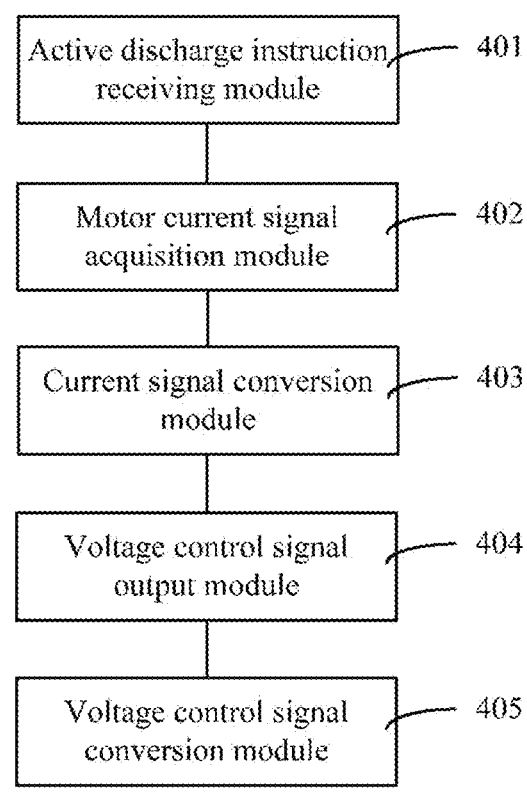
FIG. 4 is a schematic structure diagram of a DC bus discharge control apparatus according to an embodiment of the present disclosure.

FIG. 4 illustrates a schematic structure diagram of a DC bus discharge control apparatus according to an embodiment of the present disclosure. The apparatus includes an active discharge instruction receiving module 401, a motor current signal acquisition module 402, a current signal conversion module 403, a voltage control signal output module 404, and a voltage control signal conversion module 405.

The active discharge instruction receiving module 401 is configured to receive an active discharge instruction.

The motor current signal acquisition module 402 is configured to acquire a motor current signal according to the active discharge instruction.

The current signal conversion module 403 is configured to convert the motor current signal into a current signal in a stator coordinate system.

The voltage control signal output module 404 is configured to output a voltage control signal in the stator coordinate system based on the current signal in the stator coordinate system and a current reference instruction of a preset stator coordinate system, the current reference instruction of the preset stator coordinate system being a high-frequency alternating current.

In an embodiment, the voltage control signal output module 404 outputs the voltage control signal in the stator coordinate system by performing a feedback control computation on the current signal in the stator coordinate system and the current reference instruction of the preset stator coordinate system.

The voltage control signal conversion module 405 is configured to convert the voltage control signal in the stator coordinate system into a three-phase voltage control signal, and control a working state of a switching device according to the three-phase voltage control signal.

In an embodiment, the voltage control signal conversion module 405 generates a control signal for controlling the switching device after performing PWM on the three-phase voltage control signal.

Figure 5:
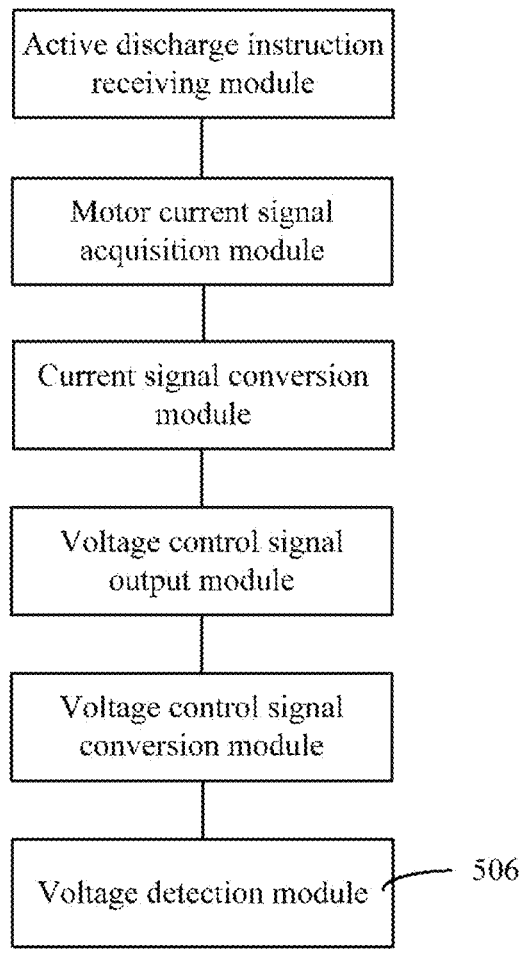
FIG. 5 is a schematic structure diagram of a DC bus discharge control apparatus according to another embodiment of the present disclosure.

As shown in FIG. 5, based on the embodiment as shown in FIG. 4, the apparatus in another embodiment further includes a voltage detection module 506.

The voltage detection module 506 is configured to control, when voltage on a DC bus is detected to reach a preset safe voltage, the switching device to be turned off, and a motor controller controls a motor to stop discharging.

Those skilled in the art can understand that all or part of the processes in the above method embodiments may be implemented by a computer program to instruct related hardware, and the program may be stored in a nonvolatile computer-readable storage medium. When the program is executed, the flow of each method embodiment as described above may be included. Any reference to a memory, storage, database, or other media used in various embodiments provided by the present application may include nonvolatile and/or volatile memories. The nonvolatile memory may include a Read Only Memory (ROM), a Programmable ROM (PROM), an Electrically Programmable ROM (EPROM), an Electrically Erasable Programmable ROM (EEPROM), or a flash memory. The volatile memory may include a Random Access Memory (RAM) or an external cache memory. By way of illustration and not limitation, RAM is available in a variety of formats, such as a Static RAM (SRAM), a Dynamic RAM (DRAM), a Synchronous DRAM (SDRAM), a Dual Data Rate SDRAM (DDRS-DRAM), an Enhanced SDRAM (ESDRAM), a Synchlink DRAM (SLDRAM), a Rambus Direct RAM (RDRAM), a Direct Rambus Dynamic RAM (DRDRAM), and a Rambus Dynamic RAM (RDRAM).

Accordingly, an embodiment of the present disclosure also provides a storage medium 701 on which a computer program is stored, wherein the computer program is executed by a processor 702 to implement the DC bus discharge control method as described in any one of the above. The storage medium 701 may be a magnetic disk, an optical disk, a Read-Only Memory (ROM), or a Random Access Memory (RAM).

An embodiment of the present disclosure also provides a computer device, which includes a processor 802, a memory 801 and a computer program that is stored on the memory 801 and is able to be executed by the processor 802. The computer program is executed by the processor 802 to implement the DC bus discharge control method as described in any one of the above.

The above embodiments are merely illustrative of several implementation manners of the present disclosure with specific and detailed description, and are not to be construed as limiting the patent scope of the present disclosure. It is to be noted that a number of variations and modifications may be made by those of ordinary skill in the art without departing from the conception of the present disclosure, and all fall within the scope of protection defined by the appended claims of the present disclosure. Therefore, the scope of protection of the present disclosure should be determined by the appended claims.

What is claimed is:

1. A Direct Circuit (DC) bus discharge control method, comprising:
    receiving an active discharge instruction;
    acquiring a motor current signal according to the active discharge instruction;
    converting the motor current signal into a current signal in a stator coordinate system;
    outputting a voltage control signal in the stator coordinate system based on the current signal in the stator coordinate system and a current reference instruction of a preset stator coordinate system, wherein the current reference instruction of the preset stator coordinate system is a high-frequency alternating current, a current reference signal of the current reference instruction of the stator coordinate system comprises an $\alpha$-axis component current and a $\beta$-axis component current, in any one period T, a definite integral result of the $\alpha$-axis component current is 0, a definite integral result of the $\beta$-axis component current is 0, a definite integral result of the difference between the square of the $\alpha$-axis component current and the square of the $\beta$-axis component current is 0, and a definite integral result of a product of the $\alpha$-axis component current and the $\beta$-axis component current is 0; and
    converting the voltage control signal in the stator coordinate system into a three-phase voltage control signal, and controlling a working state of a switching device according to the three-phase voltage control signal.

2. The DC bus discharge control method as claimed in claim 1, further comprising:
    when detecting that voltage on a DC bus reaches a preset safe voltage, controlling the switching device to be turned off.

3. A non-transitory storage medium, on which a computer program is stored, wherein the computer program is executed by a processor to implement the DC bus discharge control method as claimed in claim 2.

4. The DC bus discharge control method as claimed in claim 1, wherein outputting the voltage control signal in the stator coordinate system based on the current signal in the stator coordinate system and the current reference instruction of the preset stator coordinate system comprises:
    outputting the voltage control signal in the stator coordinate system by performing a feedback control computation on the current signal in the stator coordinate system and the current reference instruction of the preset stator coordinate system.

5. The DC bus discharge control method as claimed in claim 1, wherein controlling the working state of the switching device according to the three-phase voltage control signal comprises:
    generating a control signal for controlling the switching device by performing Pulse Width Modulation (PWM) on the three-phase voltage control signal.

6. The DC bus discharge control method as claimed in claim 1, wherein
    converting the motor current signal into the current signal in the stator coordinate system comprises: converting the motor current signal into the current signal in the stator coordinate system by Clarke transformation; and
    converting the voltage control signal in the stator coordinate system into the three-phase voltage control signal comprises: converting the voltage control signal in the stator coordinate system into the three-phase voltage control signal by Clarke transformation.

7. A non-transitory storage medium, on which a computer program is stored, wherein the computer program is executed by a processor to implement the DC bus discharge control method as claimed in claim 1.

8. A Direct Circuit (DC) bus discharge control apparatus, comprising:
    an active discharge instruction receiving module, configured to receive an active discharge instruction;
    a motor current signal acquisition module, configured to acquire a motor current signal according to the active discharge instruction;
    a current signal conversion module, configured to convert the motor current signal into a current signal in a stator coordinate system;
    a voltage control signal output module, configured to output a voltage control signal in the stator coordinate system based on the current signal in the stator coordinate system and a current reference instruction of a preset stator coordinate system, wherein the current reference instruction of the preset stator coordinate system is a high-frequency alternating current, a current reference signal of the current reference instruction of the stator coordinate system comprises an $\alpha$-axis component current and a $\beta$-axis component current, in any one period T, a definite integral result of the $\alpha$-axis component current is 0, a definite integral result of the $\beta$-axis component current is 0, a definite integral result of the difference between the square of the $\alpha$-axis component current and the square of the $\beta$-axis component current is 0, and a definite integral result of a product of the $\alpha$-axis component current and the $\beta$-axis component current is 0; and
    a voltage control signal conversion module, configured to convert the voltage control signal in the stator coordinate system into a three-phase voltage control signal, and control a working state of a switching device according to the three-phase voltage control signal.

9. The DC bus discharge control apparatus as claimed in claim 8, further comprising:
a voltage detection module, configured to control, when voltage on a DC bus is detected to reach a preset safe voltage, the switching device to be turned off.

10. The DC bus discharge control apparatus as claimed in claim 8, wherein the voltage control signal output module is configured to:
output the voltage control signal in the stator coordinate system by performing a feedback control computation on the current signal in the stator coordinate system and the current reference instruction of the preset stator coordinate system.

11. The DC bus discharge control apparatus as claimed in claim 8, wherein the voltage control signal conversion module is configured to:
generate a control signal for controlling the switching device by performing Pulse Width Modulation (PWM) on the three-phase voltage control signal.

12. The DC bus discharge control apparatus as claimed in claim 8, wherein
the current signal conversion module is configured to convert the motor current signal into the current signal in the stator coordinate system by Clarke transformation; and
the voltage control signal conversion module is configured to convert the voltage control signal in the stator coordinate system into the three-phase voltage control signal by Clarke transformation.

13. A computer device, comprising a processor, a memory and a computer program that is stored on the memory and is able to be executed by the processor, wherein the computer program is executed by the processor to implement a DC bus discharge control method comprising:
receiving an active discharge instruction;
acquiring a motor current signal according to the active discharge instruction;
converting the motor current signal into a current signal in a stator coordinate system;
outputting a voltage control signal in the stator coordinate system based on the current signal in the stator coordinate system and a current reference instruction of a preset stator coordinate system, wherein the current reference instruction of the preset stator coordinate system is a high-frequency alternating current, a current reference signal of the current reference instruction of the stator coordinate system comprises an α-axis component current and a β-axis component current, in any one period T, a definite integral result of the α-axis component current is 0, a definite integral result of the β-axis component current is 0, a definite integral result of the difference between the square of the α-axis component current and the square of the β-axis component current is 0, and a definite integral result of a product of the α-axis component current and the β-axis component current is 0; and
converting the voltage control signal in the stator coordinate system into a three-phase voltage control signal, and controlling a working state of a switching device according to the three-phase voltage control signal.

14. The computer device as claimed in claim 13, wherein the computer program is executed by the processor to implement the DC bus discharge control method further comprising:
when detecting that voltage on a DC bus reaches a preset safe voltage, controlling the switching device to be turned off.

15. The computer device as claimed in claim 13, wherein outputting the voltage control signal in the stator coordinate system based on the current signal in the stator coordinate system and the current reference instruction of the preset stator coordinate system comprises:
outputting the voltage control signal in the stator coordinate system by performing a feedback control computation on the current signal in the stator coordinate system and the current reference instruction of the preset stator coordinate system.

16. The computer device as claimed in claim 13, wherein controlling the working state of the switching device according to the three-phase voltage control signal comprises:
generating a control signal for controlling the switching device by performing Pulse Width Modulation (PWM) on the three-phase voltage control signal.

17. The computer device as claimed in claim 13, wherein converting the motor current signal into the current signal in the stator coordinate system comprises: converting the motor current signal into the current signal in the stator coordinate system by Clarke transformation; and
converting the voltage control signal in the stator coordinate system into the three-phase voltage control signal comprises: converting the voltage control signal in the stator coordinate system into the three-phase voltage control signal by Clarke transformation.

* * * * *